US010393338B2

(12) United States Patent
Heusinger

(10) Patent No.: US 10,393,338 B2
(45) Date of Patent: Aug. 27, 2019

(54) HEADLIGHT AND HOUSING END CAP

(71) Applicant: Thomas Michael Heusinger, Orchard Park, NY (US)

(72) Inventor: Thomas Michael Heusinger, Orchard Park, NY (US)

( * ) Notice: Subject to any disclaimer, the term of this patent is extended or adjusted under 35 U.S.C. 154(b) by 0 days.

(21) Appl. No.: 15/728,157

(22) Filed: Oct. 9, 2017

(65) Prior Publication Data

US 2018/0100628 A1 Apr. 12, 2018

Related U.S. Application Data

(60) Provisional application No. 62/406,154, filed on Oct. 10, 2016.

(51) Int. Cl.

| | |
|---|---|
| ***F21V 5/00*** | (2018.01) |
| ***F21S 41/32*** | (2018.01) |
| ***B60Q 1/00*** | (2006.01) |
| ***B60Q 1/04*** | (2006.01) |
| ***F21V 17/12*** | (2006.01) |
| ***F21V 7/04*** | (2006.01) |
| ***F21S 41/20*** | (2018.01) |
| ***F21S 41/162*** | (2018.01) |
| *F21S 45/50* | (2018.01) |
| *F21S 41/19* | (2018.01) |
| *F21S 41/29* | (2018.01) |

(52) U.S. Cl.

CPC .............. *F21S 41/32* (2018.01); *B60Q 1/007* (2013.01); *B60Q 1/045* (2013.01); *B60Q 1/0433* (2013.01); *F21S 41/162* (2018.01); *F21S 41/285* (2018.01); *F21V 7/041* (2013.01); *F21V 17/12* (2013.01); *B60Q 2900/10* (2013.01); *F21S 41/19* (2018.01); *F21S 41/29* (2018.01); *F21S 45/50* (2018.01)

(58) Field of Classification Search

CPC .......... F21S 41/32; F21S 45/50; F21S 41/162; F21S 41/285; B06Q 1/007; B06Q 1/0433; B06Q 1/045; B06Q 2900/10; F21V 7/041; F21V 17/12

USPC .................................................. 362/520, 507

See application file for complete search history.

(56) References Cited

U.S. PATENT DOCUMENTS 2,744,999 A * 5/1956 Arnejo ................ B60Q 1/0433 362/507
2016/0201866 A1* 7/2016 Kay ...................... B61D 29/00 362/520

* cited by examiner

*Primary Examiner* — Karl D Frech
(74) *Attorney, Agent, or Firm* — Amir Bishara

(57) ABSTRACT

A headlight housing assembly for mounting a projector lamp. The headlight housing eliminates the need to cut a stock headlight housing of a motor vehicle for an aftermarket adaptation to receive a projector lamp. The invention permits installation of a properly aligned projector, mounted securely to the vehicle, with no mess created. The design results in a professional looking product using stronger materials for a longer expected life.

9 Claims, 4 Drawing Sheets

HEADLIGHT AND HOUSING END CAP

CROSS-REFERENCE TO RELATED APPLICATION

This application claims the benefit of priority of U.S. provisional application No. 62/406,154, filed Oct. 10, 2017, the contents of which are herein incorporated by reference.

BACKGROUND OF THE INVENTION

The present invention relates to lighting housings, and more particularly to aftermarket headlight housings for motor vehicles.

The advent of projector bulbs, particularly high brightness bulbs, for motor vehicles provides improved visibility and efficiency for vehicles. However, currently in the art, the only way to mount a projector in a stock motor vehicle headlight housing that was not originally configured for projectors was to cut away a stock housing and epoxy the projector to the remaining pieces of the stock housing. Cutting round headlight housings is difficult to ensure a uniform and even modification. Cutting a stock housing and mounting with epoxy would often result in misaligned or poorly mounted projectors. This practice also creates quite a mess. Moreover, dust and debris can damage the other components of the headlights.

As can be seen, there is a need for an improved headlight housing that eliminates the need to cut the stock housing and align the projector, thereby eliminating any dust or debris.

SUMMARY OF THE INVENTION

In one aspect of the present invention, a headlight housing for adapting a filament headlamp configured motor vehicle to accept a projection headlamp lamp assembly, includes a forward divergent end portion having a beam reflector extending rearwardly from a shouldered portion. A mounting portion having a front face, an aft face and a sidewall defining a cavity dimensioned to receive a projector of the projection headlamp assembly. An aft cylindrical portion extends from the aft face of the mounting portion, such that an interior cavity of the aft cylindrical portion is dimensioned to receive a base of the projection headlamp assembly.

The headlight housing may also include an annular rim extending from a periphery of the shouldered portion, such that the annular rim configured to receive attachment of a lens to the headlight housing. A plurality of mounting apertures extend between the front face and the aft face of the mounting portion and are configured to receive a fastener to secure the headlight housing to the motor vehicle.

In other aspects of the invention. a projector mount is defined on a back end of the aft cylindrical portion. A plurality of bores may extend through an aft face of the projector mount and are configured to carry a wire for the headlamp assembly. The projector mount may also have an annular depression formed in the aft face of the projector mount, with a projector lamp aperture defined through a center of the aft face of the projector mount. The projector mount may also have a plurality of attachment flanges disposed in a spaced apart relation around the aft cylindrical portion.

Other aspects of the invention include a headlight housing assembly for adapting a filament headlamp configured motor vehicle to accept a projection headlamp lamp assembly. The headlight housing assembly includes a headlight housing having a forward divergent end portion with a beam reflector extending rearwardly from a shouldered portion. A mounting portion extends from the beam reflector and has a front face, an aft face, and a sidewall defining a cavity dimensioned to receive a projector of the projection headlamp assembly. An aft cylindrical portion extends from the aft face of the mounting portion. An interior cavity of the aft cylindrical portion is dimensioned to receive a base of the projection headlamp assembly, a projector mount defined on a back end of the aft cylindrical portion; and a housing end cap having a forward annular face dimensioned to be received in a corresponding annular depression defined in an aft face of the projector mount.

In some embodiments the headlight housing assembly may also include a plurality of bores extending through an aft face of the projector mount that are configured to carry a wire for the headlamp assembly. A slotted opening is defined through a face of the housing end cap and is configured to carry the wire through the housing end cap. Preferably, a plurality of attachment flanges are disposed in a spaced apart relation around the aft cylindrical portion. A plurality of flanges also extend from a peripheral edge of the housing end cap in a corresponding spaced apart relation to the plurality of attachment flanges. A bore is defined in each of the plurality of attachment flanges and the plurality of flanges and are configured to receive a fastener to secure the end cap to the headlight housing. In yet other embodiments, an annular rim is defined around the shouldered portion and configured to receive a halo lamp of the projection lamp assembly. A lens may also be attached to surround the annular rim.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provides a headlight housing for customizing a motor vehicle with projection type lamps. As previously indicated, prior to the present invention the only way to mount a projector in a 7" vehicle headlight was to cut away a stock housing of the vehicle and epoxy the projector to the remaining housing piece. This invention eliminates the need to use a stock housing and reduces the amount of work needed to properly mount a projector and furthermore virtually eliminates the possibility of mounting the projector incorrectly.

The invention described here eliminates the need to cut the housing and align the projector, thereby eliminating any dust or debris. The result is a properly aligned projector, mounted securely with no mess created. The design results in a professional looking product using stronger materials for a longer expected life.

Figure 1:
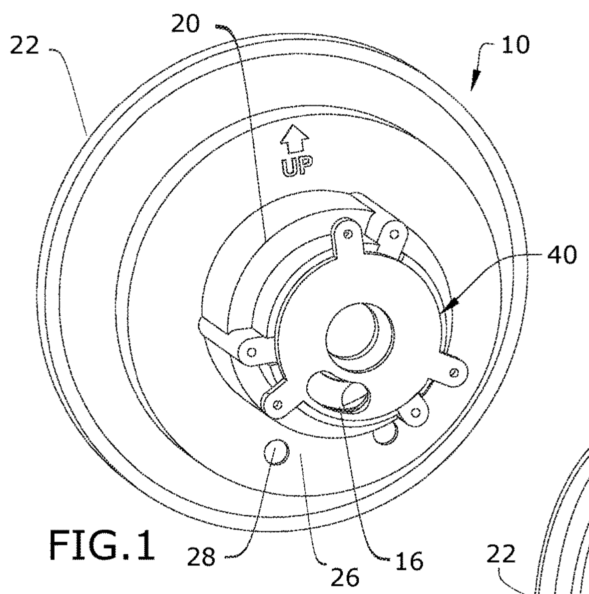
FIG. 1 is a perspective view of the headlight housing.
Figure 10:
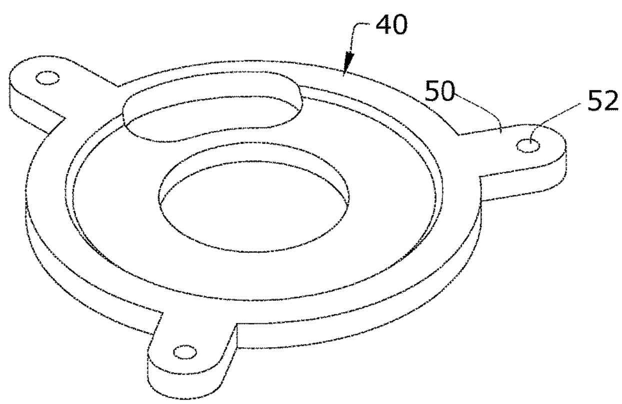
FIG. 10 is a perspective view of the housing endcap.
Figure 11:
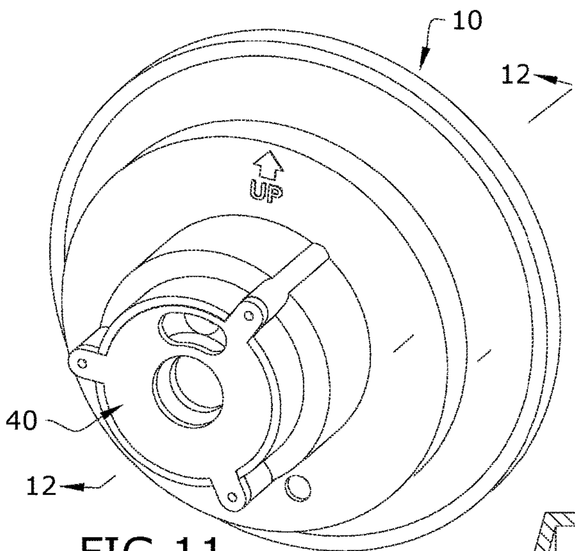
FIG. 11 is a perspective view of the headlight housing and endcap assembly.
Figure 12:
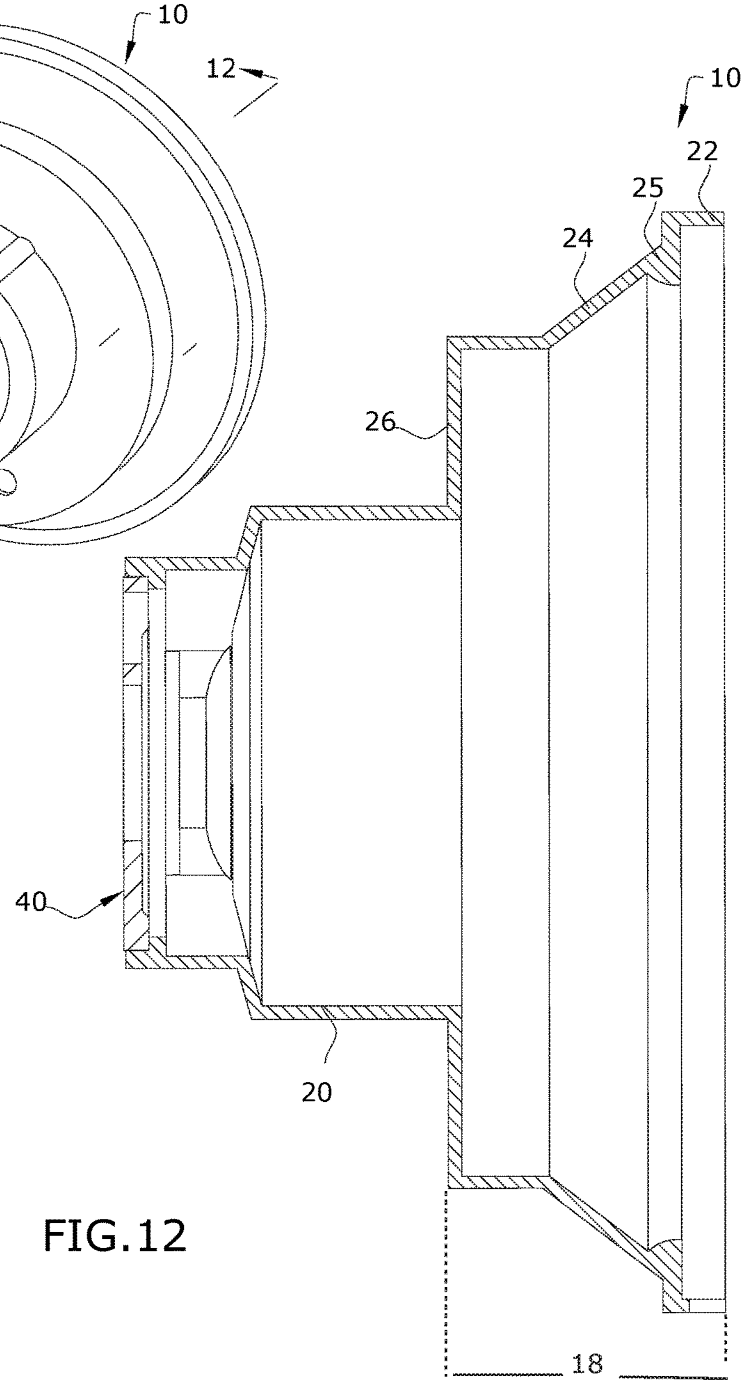
FIG. 12 is a section view of the headlight housing and endcap assembly taken along line 12-12 in FIG. 11.

A headlight housing assembly of the present invention may be seen in reference to FIGS. 1, 11 and 12. The headlight housing assembly includes a headlight housing 10, shown in FIGS. 2-7, and a housing end cap 40, shown in reference to FIGS. 8-10. A projector or bulb 14 may be mounted into the headlight housing assembly. The headlight wires 16 may be routed through the headlight housing 10 and through the housing end cap 40.

Figure 2:
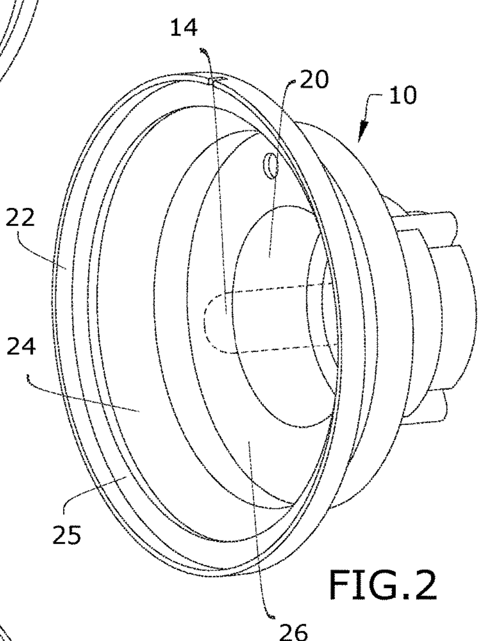
FIG. 2 is a perspective view of the headlight housing.
Figure 3:
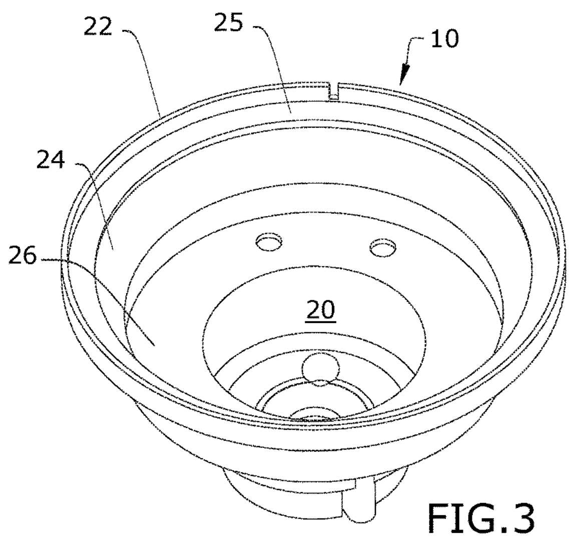
FIG. 3 is a perspective view of the headlight housing.
Figure 4:
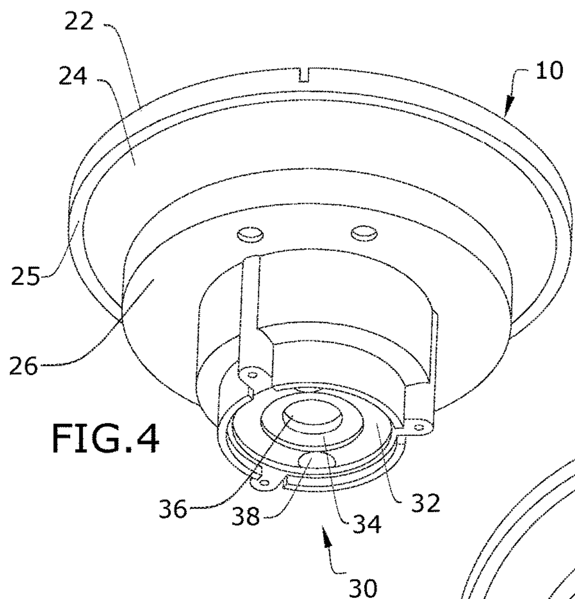
FIG. 4 is a perspective view of the headlight housing.
Figure 5:
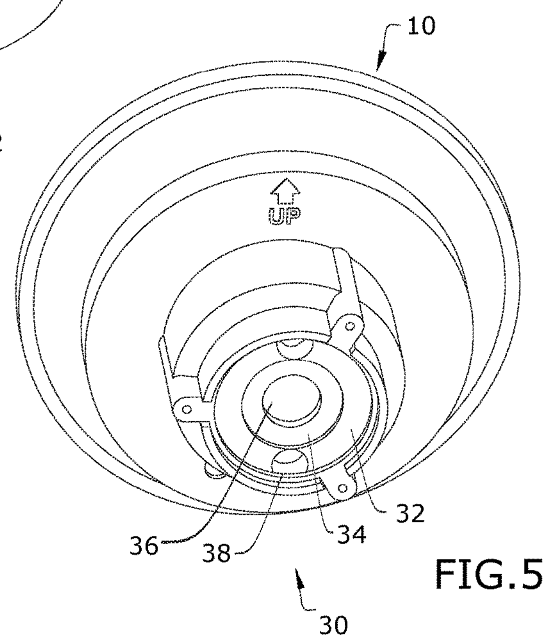
FIG. 5 is a perspective view of the headlight housing.
Figure 6:
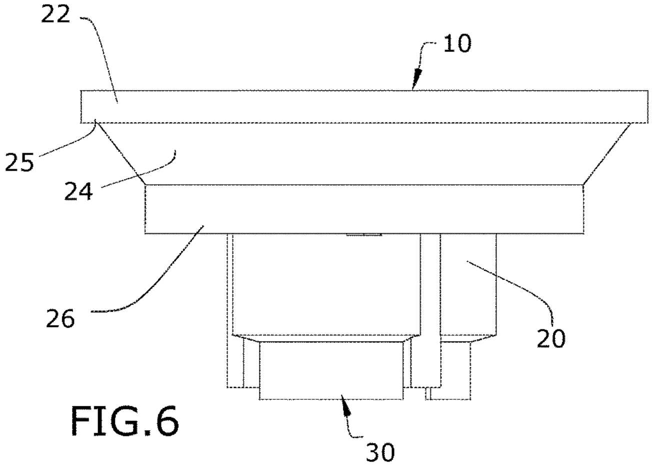
FIG. 6 is a side elevation view of the headlight housing.
Figure 7:
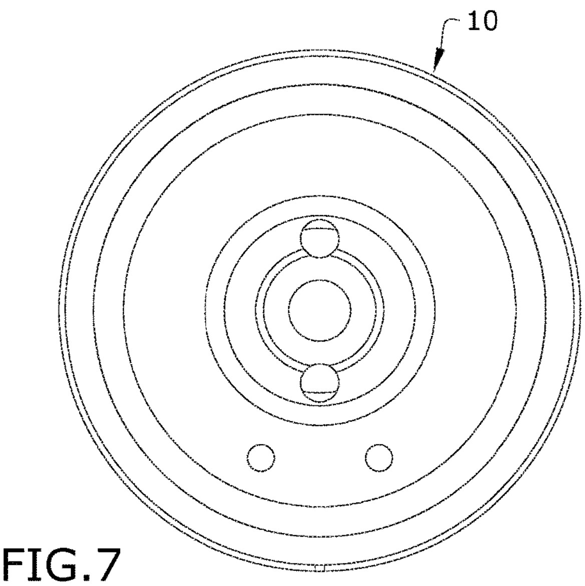
FIG. 7 is a top plan view of the headlight housing.

As seen in reference to FIG. 2, the headlight housing 10 has a substantially circular shape configured to be received in a motor vehicle headlight mount equipped with conventional round headlights. The headlight housing 10 has forward divergent end portion 18 and an aft cylindrical portion 20 extending from an aft surface of the divergent end portion 18. An annular rim 22 is defined at a front end of the divergent end portion 18. An annular frusto-conical beam reflector 24 portion is positioned inboard from and coaxial with the annular rim 22 opening. The beam reflector portion 24 has diverging sidewalls, which assist in focusing the light on a roadway.

A shoulder 25 is defined adjacent to the annular rim 22. The shoulder 25 is configured to support an optional halo lamp that may be carried in the headlight housing 10 anteriorly of and surrounding the projection lamp 14. Wiring 16 for the halo light may be carried through a bore 38 and the slotted opening 48 of the housing end cap 40.

Inboard from the reflector portion 24 is a mounting portion 26 having an annular sidewall generally aligned with a longitudinal axis the headlight housing 10. The annular sidewall of the mounting portion 26 is substantially coaxial with the annular rim 20 and beam reflector portion 24. An aft surface of the mounting portion 26 has a plurality of mounting holes 28 to receive fasteners for securing the headlight assembly to the motor vehicle.

The aft cylindrical portion 20 extends from an aft surface of the mounting portion 26 and has a substantially reduced radius from that of the forward divergent end 18. A back end of the cylindrical portion 20 has a projector mount 30. As best seen in reference to FIGS. 3-4, the projector mount 30 includes an annular depression 32 formed on an aft face of the cylindrical portion 20. The annular depression 32 is dimensioned to receive a forward annular face 42 of the housing end cap 40. The annular depression 32 circumscribes an interior projector depression 34 shaped to accept a base of a projector lamp 14. The projector depression 34 may have a keyed sidewall region for orienting the projector lamp 14 within the headlight housing 10.

A projection lamp aperture 36 is defined through a central region of the projector mount 30 and is dimensioned to receive a lamp portion of the projection lamp 14 there through. The projector mount 30 also has a plurality of bores 38 defined in a spaced apart relation around the periphery of the annular depression 32.

Figure 8:
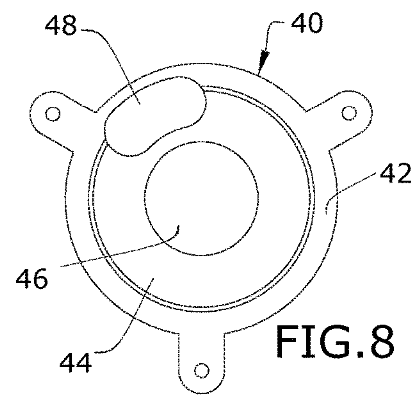
FIG. 8 is a top view of a housing endcap.
Figure 9:
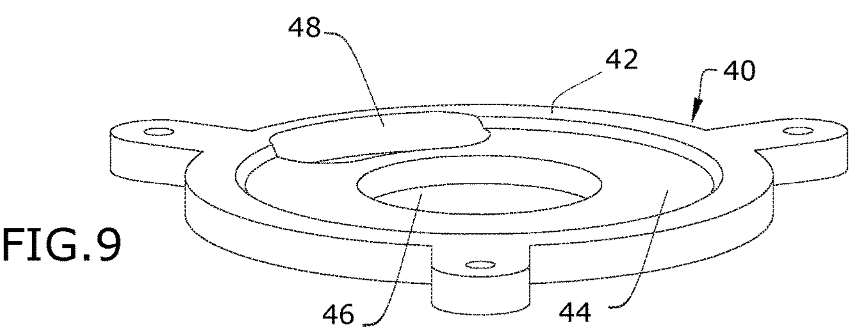
FIG. 9 is a perspective view of the housing endcap.

An endcap 40 is illustrated in reference to FIGS. 8-10 having a front surface with an annular depression 44 formed within the forward annular face 42 to receive a back surface of a base of a projector lamp 14. A center opening 46 is defined in the annular depression 44 to receive a terminal end of the projector lamp 14. A slotted opening 48 is defined at the periphery of the depression and is configured to receive wiring for connection of the projector lamp 14. A plurality of flanges 50 extend from the periphery of the endcap 40 and are disposed so that a fastener opening 52 is aligned with the plurality of bores 54 at the back of the headlight housing 10.

The housing end cap 40 is then pressed into place and secured with screws completing the seal, protecting the wires 16. The slotted opening 48 permits the wiring 16 to be carried through the endcap 40 and twisting of the endcap 40 to secure it within the aft end of the projector mount 30, thereby and preventing water intrusion, ensuring a proper fitment into the headlight bucket, and resulting in a professional looking installation. A rubber gasket may be applied between the headlight housing 10 and the end cap 40 to improve the seal of the projection lamp 14 mounted within the headlight housing 10.

The housing 10 should be installed into the vehicle's headlight bucket using the markings on the housing, ensuring the arrow pointing UP is set at the 12 o'clock position. The housing will then fit into the bucket allowing for horizontal adjustments and vertical adjustments to ensure a proper beam pattern.

While the invention has been described in relation to an adaptation for motor vehicles, the housing can also be adapted to be used for home lighting as well. Such uses include custom made automotive themed lighting (i.e. using an old Jeep Grill to mount incandescent light bulbs).

It should be understood, of course, that the foregoing relates to exemplary embodiments of the invention and that modifications may be made without departing from the spirit and scope of the invention as set forth in the following claims.

What is claimed is:

1. A headlight housing for adapting a filament headlamp configured motor vehicle to accept a projection headlamp lamp assembly, comprising:

a forward divergent end portion having a beam reflector extending rearwardly from a shouldered portion, and a mounting portion having a front face and an aft face and a sidewall defining a cavity dimensioned to receive a projector of the projection headlamp assembly;

an aft cylindrical portion extending from the aft face of the mounting portion, wherein an interior cavity of the aft cylindrical portion is dimensioned to receive a base of the projection headlamp assembly; and an annular rim defined around the shouldered portion configured to receive a halo lamp of the projection lamp assembly.

2. The headlight housing of claim 1 further comprising:

a plurality of mounting apertures extending between the front face and the aft face of the mounting portion configured to receive a fastener to secure the headlight housing to the motor vehicle.

3. The headlight housing of claim 1, further comprising:

a projector mount defined on a back end of the aft cylindrical portion; and a plurality of bores extending through an aft face of the projector mount configured to carry a wire for the headlamp assembly.

4. The headlight housing of claim 3, the projector mount further comprising:

an annular depression formed in the aft face of the projector mount; and a projector lamp aperture defined through a center of the aft face of the projector mount.

5. The headlight housing of claim 4, the projector mount further comprising:

a plurality of attachment flanges disposed in a spaced apart relation around the aft cylindrical portion.

6. A headlight housing assembly for adapting a filament headlamp configured motor vehicle to accept a projection headlamp lamp assembly, comprising:

a headlight housing having a forward divergent end portion with a beam reflector extending rearwardly from a shouldered portion, a mounting portion extending from the beam reflector the mounting portion having a front face, an aft face, and a sidewall defining a cavity dimensioned to receive a projector of the projection headlamp assembly;

an aft cylindrical portion extending from the aft face of the mounting portion, wherein an interior cavity of the aft cylindrical portion is dimensioned to receive a base of the projection headlamp assembly, a projector mount defined on a back end of the aft cylindrical portion;

a housing end cap having a forward annular face dimensioned to be received in a corresponding annular depression defined in an aft face of the projector mount; and an annular rim defined around the shouldered portion configured to receive a halo lamp of the projection lamp assembly.

7. The headlight housing assembly of claim 6, further comprising:

a plurality of bores extending through an aft face of the projector mount configured to carry a wire for the headlamp assembly; and a slotted opening defined through a face of the housing end cap configured to carry the wire through the housing end cap.

8. The headlight housing assembly of claim 7, further comprising:

a plurality of attachment flanges disposed in a spaced apart relation around the aft cylindrical portion;

a plurality of flanges extending from a peripheral edge of the housing end cap in a corresponding spaced apart relation to the plurality of attachment flanges; and an bore defined in each of the plurality of attachment flanges and the plurality of flanges configured to receive a fastener to secure the end cap to the headlight housing.

9. The headlight housing assembly of claim 6, further comprising:

a lens surrounding the annular rim.

* * * * *